United States Patent [19]
Reynolds et al.

[11] Patent Number: 5,089,585
[45] Date of Patent: Feb. 18, 1992

[54] TRANSITION METAL BIS(DITHIOLENE) COMPLEX POLYMERS

[75] Inventors: John R. Reynolds, Arlington, Tex.; Fei Wang, Beijing, China

[73] Assignee: Board of Regents, The University of Texas System, Austin, Tex.

[21] Appl. No.: 517,677

[22] Filed: May 1, 1990

[51] Int. Cl.[5] .......................................... C08G 18/32
[52] U.S. Cl. ..................... 528/73; 252/587; 430/510; 528/68; 528/294; 528/295; 528/337; 528/360; 528/363; 528/372; 359/350
[58] Field of Search ............. 528/68, 73, 294, 295, 528/337, 363, 360, 372; 252/587; 430/510; 350/1.1, 311

[56] References Cited

U.S. PATENT DOCUMENTS

| | | | |
|---|---|---|---|
| 4,111,857 | 9/1978 | Engler et al. | 528/226 |
| 4,763,966 | 8/1988 | Suzuki et al. | 350/1.1 |
| 4,808,638 | 2/1989 | Steinkraus et al. | 528/25 |

FOREIGN PATENT DOCUMENTS 2838724  3/1980  Denmark.

OTHER PUBLICATIONS

Wang et al., "Soluble and Electroactive Nickel Bis(dithiolene) Complex Polymers", *Macromolecules*, vol. 21, No. 9, pp. 2887-2889 (1988).
Reynolds et al., "Electroactive and Soluble Polyheterocycles and Transition Metal Complex Polymers", *Synthetic Metals*, vol. 28, pp. C621-628 (1989).
Jolly et al., "Soluble and Electroactive Transition Metal Complex Polymers", *Synthetic Metals*, vol. 29, pp. F189-194 (1989).
Reynolds et al., "Electrically Conductive and Electroactive Transition Metal Tetrathiolate Polymers", ACS PMSE Proceedings, pp. 340-343 (Fall 1989).
Reynolds et al., "Intrinsically Electrically Conducting Poly(metal tetrathiooxalates)", *Macromolecules*, vol. 20, pp. 1184-1191 (1987).
Vicente et al., "Synthesis Characterization and Properties of Highly Conducting Organometallic Polymers Derived from the Ethylene Tetrathiolate Anion", *Synthetis Metals*, vol. 13, pp. 265-280 (1986).
Poleschner et al., "Synthese und Eigenschaften elektronenleitender Poly-Dithiolenkomplexe mit Ethylenetetrathiolat und Tetrathiafulvalentetrathiolat als Bruckenliganden", *J. f. prakt. Chemie.*, vol. 325, No. 6, pp. 957-975 (1983).
Gotzfried et al., "Transition Metal Complexes with the Tetrathiosquarate Dianion as Bridging Bischelate Ligand", *Angew. Chem. Int. Ed. Engl.*, vol. 18, No. 6, pp. 463-464 (1979).
Bohm, "Neighbourstrand Interactions on One-Dimensional Crystal Orbital Calculations on Organometallic Polymers-The Tetrathiosquarato Nickel(II) System", *Physica*, vol. 124B, pp. 327-351 (1984).
Rivera et al., "Synthesis and Properties of Tetrathiafulvalene-Metal Bisdithiolene Macromolecules", *J. C. S. Chem. Comm.*, pp. 184-185 (1979).
Ribas et al., "Coordination Chemistry-Prime Importance of Oxidation in the Synthesis of Highly Conducting Tetrathiafulvalene-Nickel Bis(ditholene) Polymers", *C. R. Acad. Sci. Paris*, vol. 293, Series II-665 (1981).
Martinez et al., "Highly Conducting Organometallic Polymers", pp. 428-430.

(List continued on next page.)

*Primary Examiner*—Maurice J. Welsh
*Assistant Examiner*—Rachel Johnson
*Attorney, Agent, or Firm*—Arnold, White & Durkee

[57] ABSTRACT

A new class of transiton metal bis(dithiolene) complex polymers having improved physical characteristics. These polymers are generally prepared by first preparing a bifunctionalized transition metal bis(ditholene) complex, then reacting the bifunctionalized complex with one or more other bifunctional compounds. A wide variety of flexible linkage can be incorporated into the polymer chain via the bifunctional reactant to vary the physical properties of the resulting polymer. The polymers can be used as near infrared filters, both as supported and freestanding films.

46 Claims, 3 Drawing Sheets

OTHER PUBLICATIONS

Teo et al., "Reactions of Tetrathionaphthalene with Transition Metal Carbonyls, Synthesis and Characterization of Two New Organometallic Semiconductors $(C_{10}H_4S_4Ni)_x$ and $[C_{10}H_4S_4Co_2(CO)_2]_x$ and a Tetrairon Cluster $C_{10}H_4S_4Fe_4(CO)_{12}$", *J. Am. Chem. Spc.*, vol. 99, 4862–4863 (1977).

Dirk et al., "Metal Poly(benzodithiolenes)", *Macromolecules*, vol. 19, No. 2, pp. 266–2699 (1986).

Tabushi et al., "New Bis(benzene-1,2-dithiolato)Ni(II) Complexes Having Intense Near-Infrared Absoprtions", *Chem. Lett.*, pp. 1373–1376 (1987).

Shiozake et al., "Pronounced Hypsochromic Shift of Absorption Band and Improved Solubility of Bis(1,2-diaryl-1,2-ethylenedithiolato)nickels, Prospective Near-IR Dyes for Optical Data Storage", *Chem. Lett.*, pp. 2393–2396 (1987).

Alvarez et al., "Dimerization and Stacking in Transition-Metal Bisdithiolenes and Tetrathiolates", *J. Am. Chem. Soc.*, vol. 107, No. 22, pp. 6253–6277 (1985).

Bousseau et al., "Highly Conducting Charge-Transfer Compounds of Tetrathiafulvalene and Transition Metal-dmit Complexes," *J. Am. Chem. Soc*, vol. 108, No. 8, pp. 1908–1916 (1986).

Giroud et al., "Mesomorphic Transition Metal Complexes. 3. Smectic and Nematic Nickel Dithienes", *Mol. Cryst. Liq. Crystl.* (Lett.), vol. 56 pp. 225–288 (1980).

Mueller-Westerhoff et al., "Mesomorphic Translation Metal Complexes. 4. Dithiene Complexes of Ni, Pd, and Pt", *Mol. Cryst. Liq. Cryst. (Lett.)*, pp. 249–255 (1980).

Cassoux et al., "Synthesis, Properties and Structure of Conductive and Superconductive Molecular Complexes and Derived Organometallic Polymers", *Synth. Met.*, vol. 19, pp. 573–578 (1987).

Grate et al., "Langmuir-Blodgett Films of a Nickel Dithiolene Complex on Chemical Microsensors for the Detection of Hydrazine", *Langmuir*, vol. 4, No. 6, pp. 1293–1301 (1988).

TRANSITION METAL BIS(DITHIOLENE) COMPLEX POLYMERS

The government may own certain rights in the present invention pursuant to grants by the Defense Advanced Research Projects Agency, Contract Nos. N00014-86-K-0769 and N00014-90-J-1320.

BACKGROUND OF THE INVENTION

1. Field of the Invention

This invention relates to transition metal bis(dithiolene) complex polymers and copolymers, and their preparation by polymerization of bifunctionalized transition metal bis(dithiolene) complexes.

2. Description of Related Art

Over the past 30 years, there has been a considerable effort devoted to the synthesis and understanding of transition metal bis(dithiolenes)[1] and structurally related complexes[2] which possess interesting electrochemical, optical, magnetic, liquid crystalline,[3] electrically conductive, superconductive[4], and near-infrared ("NIR") absorption properties.[5-7]

A number of electroactive and conductive polymers and oligomers based on the square planar $MS_4$ center have also been prepared. These include poly(metal tetrathiooxalates),[8] poly(metal ethylenetetrathiolates),[9] poly(metal tetrathiosquarates),[10] poly(metal tetrathiafulvalenetetrathiolates),[11, 12] poly(metal tetrathianaphthalenes),[13] and poly(metal benzenetetrathiolates).[14]

Although many of these polymers are potentially useful because of their electroactive and conductive properties, most of them are insoluble and infusible solids due to their ribbonlike rigid structure. During synthesis some of these systems possess solubility that may be attributed to the high charge density along the polymer backbone, but precipitation to insoluble and infusible powders prohibits processing of the polymer for practical application.

In order to address the low solubility of these fully conjugated polymers, the inventors herein have discovered the possibility of incorporating square planar metal complexes [i.e. metal bis(dithiolenes)] into the main chain of polymers that contain flexible units. The inventors previously reported[15-18] on the synthesis of a novel metal complex polymer, poly[[1,1'-oxybis[4-(1,2-dithiolatoethenyl)benzene]] nickel(II)], having the following structure:

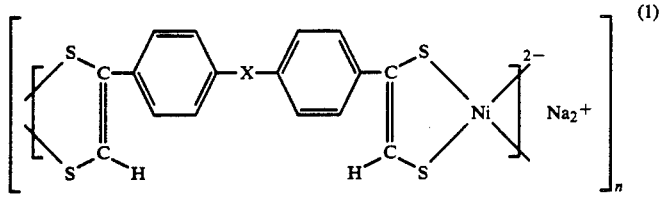

where X is oxygen.

Although this polymer, in its reduced form, is generally soluble in a variety of both aqueous and organic solvents, and exhibits electrochemical properties analogous to transition metal bis(dithiolenes), it tends to be generally insoluble in its oxidized and neutral forms. Thus, its potential application is limited. In addition, low molecular weights were obtained due to intrinsic problems of the metal complexation polymerization technique used.

It can be hypothesized that solubility and processability of compound (I) could be improved by introducing a flexible linkage X into the main chain. The synthesis of this polymer, as previously reported by the inventors, involved complexation of a tetrathiolate ligand precursor prepared via a bis(dithiocarbonate) (shown below), with a stoichiometric amount of $Ni^{2+}$.

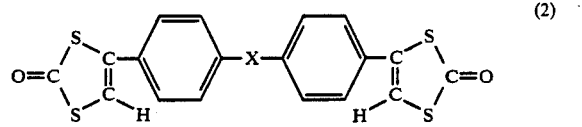

This type of synthesis tends to become problematical as the flexible linkage X becomes longer, due to the difficulty in preparing the precursor (2). For example, when the linkage is docosane, the synthesis of the ligand generally requires multiple steps and therefore the overall yield tends to be low. As a general rule in organic chemistry, increasing the substrate size and flexible side chain length significantly reduces the reactivity of the functional group in the compound due to steric blocking of the active site. From a kinetic viewpoint, the number of effective collisions between molecules may also be reduced. Typically, long reaction times, severe reaction conditions and low yields are encountered in reactions involving large molecules. Long flexible chains along the polymer backbone are generally needed in order to further increase the solubility of the polymers. However, this tends to further increase synthetic difficulties, as well as lead to added expense, lower yields, and increased time constraints. Time consuming, highly involved multistep syntheses may be required to produce products that possess little synthetic versatility. Another problem associated with such a synthesis is in maintaining stoichiometric balance between the two reactants.

Thus, there is a need to develop improved classes of polymers based on square planar $MS_4$ centers, and improved syntheses of such polymers. It is an object of this invention to provide such polymers and syntheses which address at least some of the shortcomings of the prior art.

SUMMARY OF THE INVENTION

One aspect of the present invention provides a broad class of transition metal bis(dithiolene) complex polymers and copolymers having improved characteristics. The class of polymers of the invention can be represented generally as having the following formula:

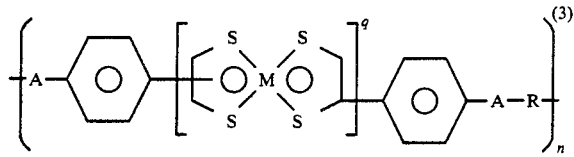

(3)

wherein:
- —A— is derived from a reactive functional group;
- —R— is an organic substituent derived from a bifunctional molecule capable of reacting with the reactive functional group;
- M is a transition metal;
- q is the oxidation state of the transition metal complex; and
- n is the chain length of the polymer.

The class of copolymers provided by the present invention have the following general random formula:

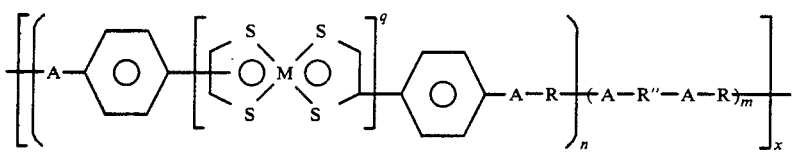 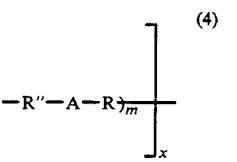

(4)

wherein:
- —A— is derived from a reactive functional group;
- —R''— is an organic substituent derived from a molecule bifunctionalized with reactive functional groups;
- —R— is an organic substituent derived from a bifunctional molecule capable of reacting with the reactive functional groups;
- M is a transition metal;
- q is the oxidation state of the transition metal complex;
- n is the chain length of the copolymer segments having bifunctionalized transition metal complex comonomer units and is a varying positive integer;
- m is the chain length of the copolymer segments having —R''— comonomer units and is a varying positive integer; and
- x is the overall chain length of the copolymer.

Other aspects of the invention provide methods of preparing the polymers (3) and copolymers (4), NIR filters comprising such compounds, and methods of filtering NIR radiation using such compounds.

In a preferred embodiment, the transition metal is one which provides a square planar transition metal complex center, such as Ni, Pd, or Pt. Such a structure may provide NIR absorptive properties to the resulting polymer or copolymer.

Preferably, the chain length of the polymer (3) or copolymer (4) is greater than about 5, most preferably, greater than about 20. This may provide the polymer or copolymer with sufficient molecular weight to attain useful mechanical properties.

In a preferred embodiment of the copolymer (4), —R''— is an alkyl unit, an aryl unit, or an organic oligomer, such as a methylene, oxymethylene, or oxyethylene chain.

Preferred syntheses of transition metal bis(dithiolene) complex polymers and copolymers as provided by this invention will now be discussed. A preferred method of preparing the polymer generally comprises the steps of preparing a transition metal bis(dithiolene) complex which is bifunctionalized, and linking the bifunctional transition metal bis(dithiolene) complex with an organic compound which is bifunctionalized with functional groups capable of reacting with the bifunctional metal bis(dithiolene) complex.

The analogous preferred method of preparing the copolymer comprises the steps of preparing a transition metal bis(dithiolene) complex which is bifunctionalized; providing a comonomer compound which is also bifunctionalized; and copolymerizing the bifunctional transition metal bis(dithiolene) complex and bifunctional comonomer compound with an organic compound which is bifunctionalized with functional groups capable of reacting with said bifunctional complex and compound.

In preferred embodiments of these methods, the bifunctional metal bis(dithiolene) complex includes proton donating end groups, and the bifunctional organic compound includes functional groups capable of reacting with the proton donating end groups (e.g. active halide or isocyanate end groups).

Examples of proton donating end groups suitable for use are:
- —OH;
- —NH$_2$;

- —(CH$_2$)$_p$—OH;
- —(CH$_2$)$_p$—NH$_2$; and

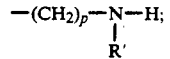

where p (hereinafter) is a positive integer.

Examples of suitable bifunctional organic compounds for reaction with such groups include:

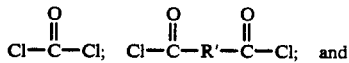

OCN—R'—NCO;

R' (hereinafter) preferably being an alkyl or an aryl.

Alternatively, the bifunctional metal bis(dithiolene) complex may include active halide end groups, while the bifunctional organic compound may include functional groups capable of reacting with the active halide end groups (e.g. proton donating end groups).

Examples of active halide end groups suitable for use are:

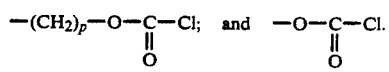

Suitable bifunctional organic compounds for reaction with such groups include, for example:

H$_2$N—R'—NH$_2$; and
HO—R'—OH

In order to attain ambient stability, the metal complex centers of the resulting polymers and copolymers can be oxidized or reduced to different oxidation states by conventional methods, such as exposure to air or reaction with an oxidizing agent, such as I$_2$ or NOPF$_6$.

As will be apparent, the methods described above may be used to yield polymers and copolymers of the class represented by formulas (3) and (4) above. Using one of the preferred embodiments discussed above, the resulting polymer (3) or copolymer (4) can be designed such that —A— is derived from a proton donating functional group. For example, —A— may be:

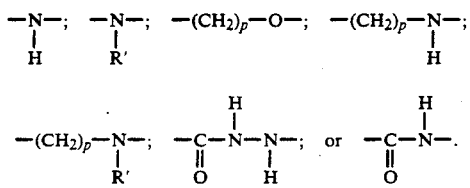

In this embodiment, —R— in formula (3) or (4) may be derived from a bifunctional molecule having active halide end groups. For example, —R— may be:

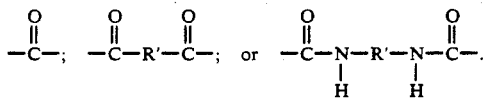

Alternatively, —A— may be derived from an active halide functional group, examples of —A— being

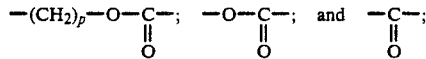

while —R— may be derived from a bifunctional molecule having proton donating end groups, examples of —R— being —O—R'—O— and —NH—R'—NH—.

The oxidation state of the transition metal complex may be adjusted, as desired, to attain ambient stability. Preferably, the oxidation state is −2, −1, 0, or +1.

Polymer (3) or copolymer (4) may be designed to serve as a NIR filter. If desired, such a NIR filter may take the form of a film of the polymer or copolymer on a surface of a transparent substrate or as freestanding film. Radiation may be directed through the polymer or copolymer to filter NIR light.

DETAILED DESCRIPTION OF PREFERRED EMBODIMENTS

The metal bis(dithiolene) complex-based polymers and copolymers provided by this invention can be used in a variety of contexts due to their optical and electrochemical properties. They can be designed for use as NIR filters, sensors (e.g. for detecting toxic gases), charge storage, and other applications. The properties of the polymers can be designed for the particular application, by controlling the number and positioning of the metal complex centers and flexible linkages within the polymer chain.

A preferred embodiment of this invention relates to preparation of a transition metal bis(dithiolene) complex-containing polymer. According to this embodiment, a transition metal bis(dithiolene) complex is first prepared having two functional groups, then reacted with another bifunctional compound to synthesize the polymer. Particularly preferred reaction schemes are analogous to conventional esterification, carbonate formation, and urethane formation.

An advantage associated with this type of synthesis is that a wide variety of flexible linkages can be incorporated into the polymer chain via the bifunctional reactant. Also, standard polymerization techniques can be used to prepare high molecular weight polymers. The functional groups in this reaction can be varied for different reactivities.

In another preferred embodiment, a third bifunctional reactant can be added to the reaction to run a copolymerization that can bring even more variety to the resulting polymer. In this way, the physical properties of the polymer products can be varied and designed for particular applications. The molecular weight and solubility of the polymer may also be increased significantly. A copolymer prepared in this manner may possess the desired properties to fit the requirements of practical applications.

Polymers based on nickel bis(dithiolene) (sometimes referred to hereinafter as "Ni-BDT") complexes will be used in the discussion below to exemplify the general polymerization and copolymerization schemes provided by this invention.

Figure 1:
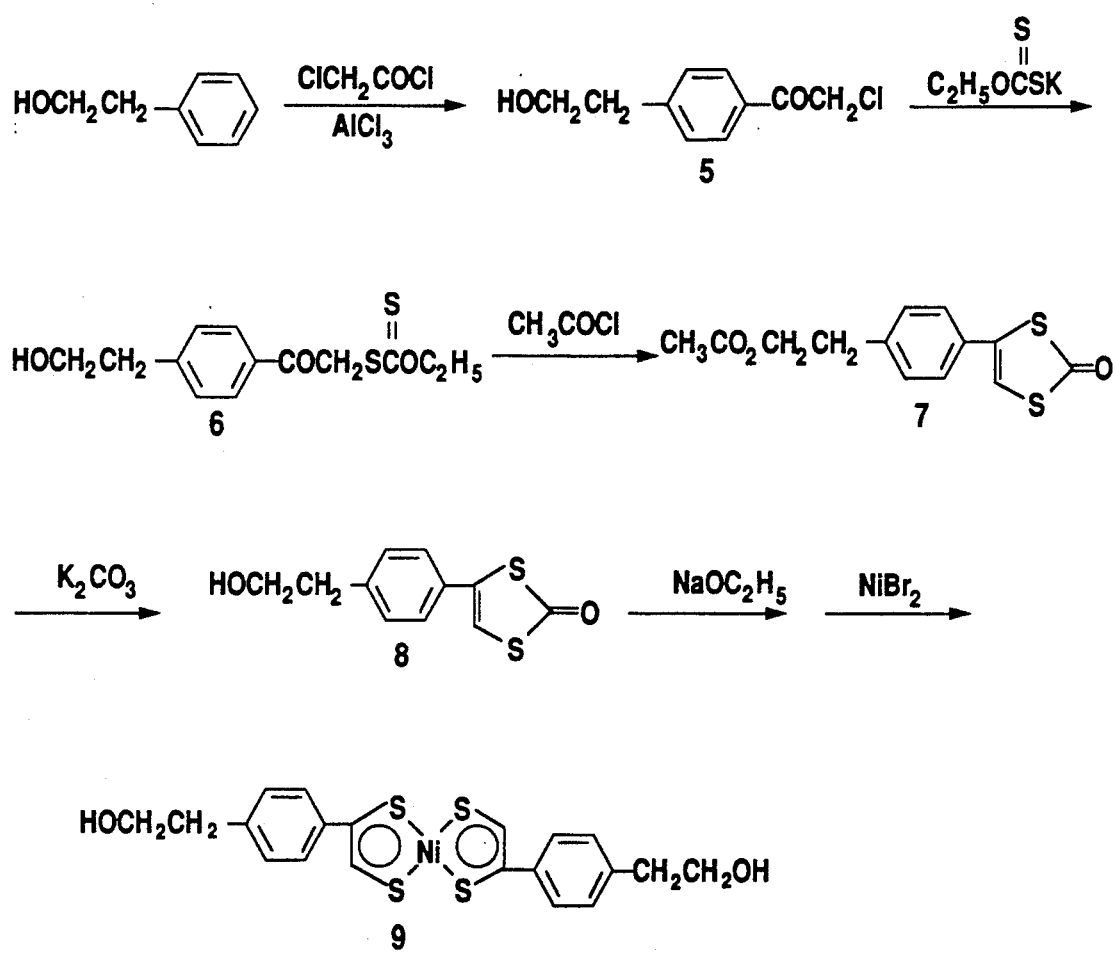
FIG. 1 is a flow chart illustrating the synthesis of a nickel bis(dithiolene) complex diol, which may be used as a precursor in the polymerization and copolymerization schemes provided by this invention.

First, synthesis of a nickel bis(dithiolene) complex diol can be carried out as shown in FIG. 1. In the scheme shown, an alcoholic hydroxy group serves as a functional group on the Ni-BDT complex. The alcoholic hydroxy group tends to be stable during the metal complexation reaction, and it has only a minimum possibility of interfering with the complexation reaction. Also, the hydroxy groups are easily protected and deprotected during the synthetic steps if necessary.

In the scheme shown in FIG. 1, the starting material is phenethyl alcohol, containing a hydroxy group which behaves as a regular aliphatic alcohol. The first step of this embodiment involves a Friedel-Crafts acylation, though with the presence of alcohol and acyl chloride in the reaction mixture, esterification is an obvious side reaction. If desired, the alcohol group may be protected. Upon considering the reaction conditions however, low temperature (−10° C.) and excess AlCl$_3$ present, it is seen that the AlCl$_3$ will complex with the hydroxy group, thus reducing its reactivity. By careful control of the reaction conditions the acylation may be the major reaction route and the esterification may be reduced to a minimum. Thus, the protection of the hydroxy group may be omitted in this acylation reaction.

The next step in FIG. 1 is a substitution reaction with O-ethylxanthic acid potassium. Though compound 7 may be used directly for the complexation reaction (the acetyl group can be cleaved by sodium ethoxide), an initial deprotection may give cleaner products. In order to avoid the possible complications caused by deacylation, compound 7 may be deprotected by aqueous K$_2$CO$_3$ solution to compound 8 before the complexation reaction.

Figure 2:
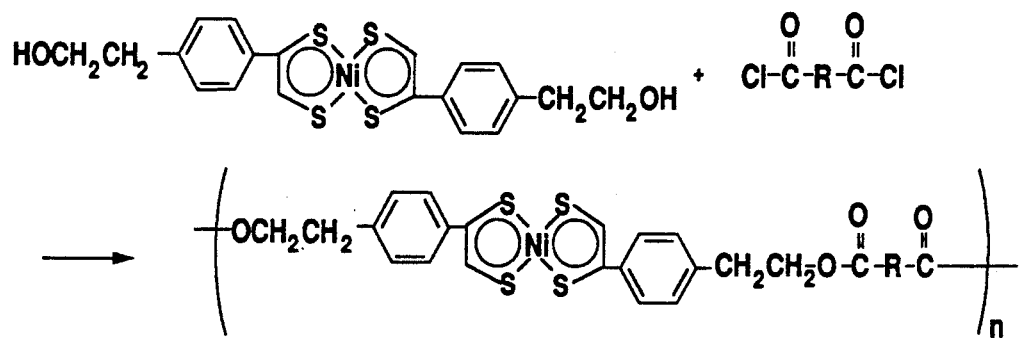
FIG. 2 is a flow chart illustrating polyester formation with the nickel bis(dithiolene) complex product of FIG. 1.

The diol 9 can then be reacted with a diacid chloride (e.g. sebacoyl chloride or terephthaloyl chloride) to give the corresponding polyester, as illustrated in FIG. 2. Polyester formation involves a low temperature, acyl chloride, and solution reaction conditions. The nickel complex may be thermally unstable, therefore, a high temperature ester-exchange polymerization method is not preferred for this reactant. The acyl chloride method has the advantage of simplicity, mild conditions, and high reaction equilibrium constant. The interfacial method is also not preferred for this synthesis because the Ni-BDT monomer is an alcoholic diol which has a low $K_a$ value so it may not provide enough alkoxide anion in the reaction. In order to have the reaction carried out in high concentration, a good solvent for the nickel complex, e.g. DMF, may be employed.

Figure 3:
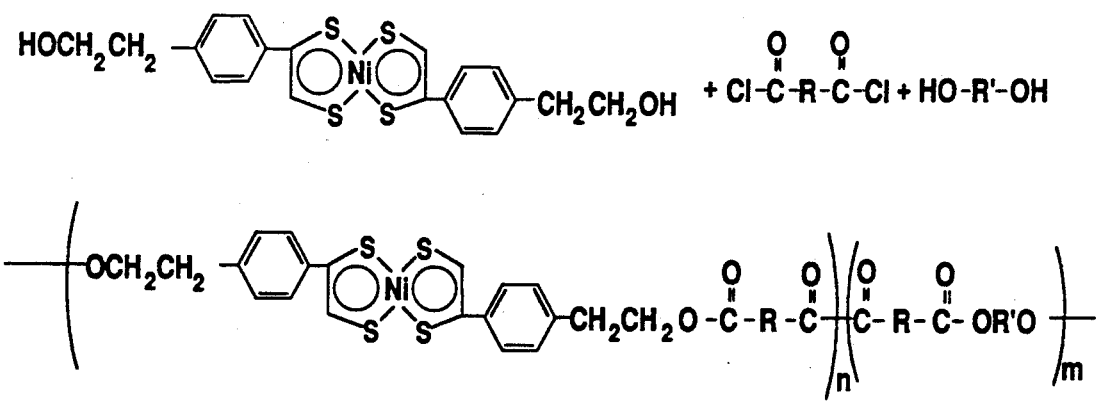
FIG. 3 is a flow chart illustrating polyester copolymer formation with the nickel bis(dithiolene) complex product of FIG. 1 and a second diol.

As illustrated in FIG. 3, other diols can be introduced to give a polyester copolymer. Examples of diols which can be used as the comonomer include ethylene glycol and bisphenol A. When both the diol and the diacid moiety are alkyl, a highly flexible polymer can be obtained. If part of the diol or diacid moiety is aryl, the polymer will tend to have a more rigid structure, and the mechanical properties of the polymer may be enhanced.

Figure 4:
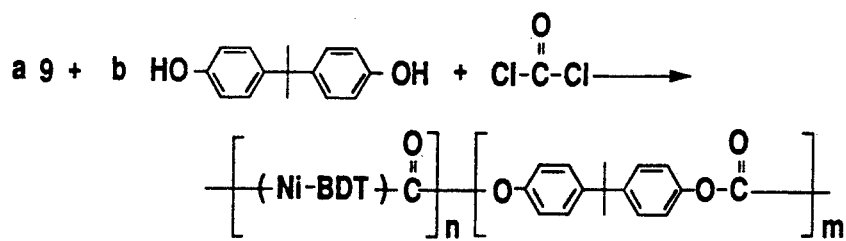
FIG. 4 is a flow chart illustrating polycarbonate copolymer formation with the nickel bis(dithiolene) complex of FIG. 1 and a second diol.

An alternative preferred reaction scheme yields Ni-BDT functionalized polycarbonates and polycarbonate copolymers, as illustrated in FIG. 4, and explained in detail in Example III below.

Figure 5:
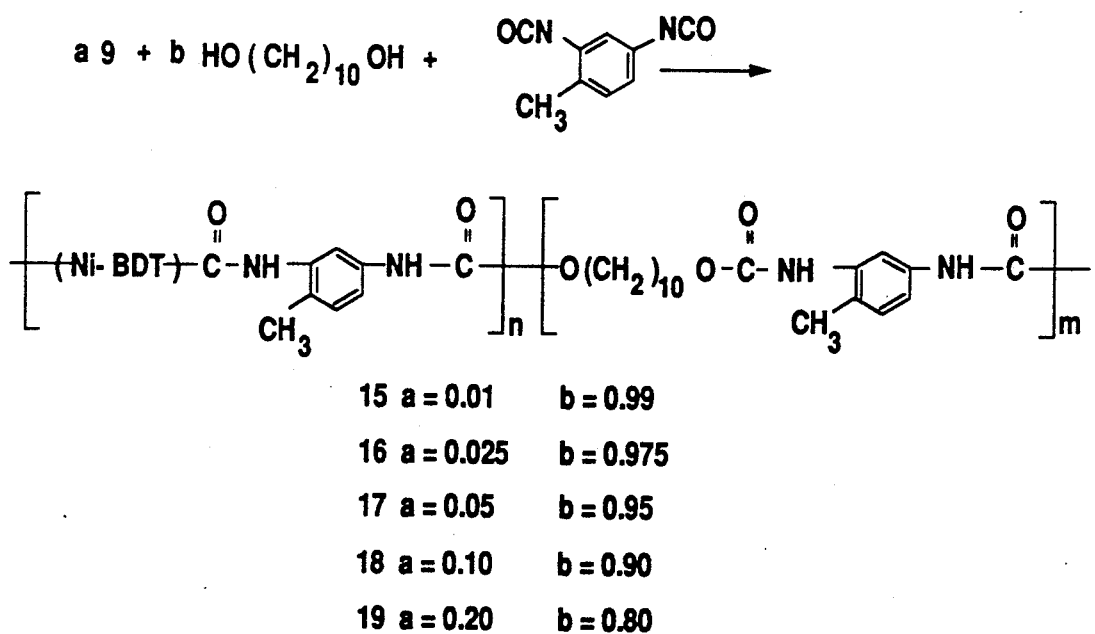
FIG. 5 is a flow chart illustrating polyurethane copolymer formation with the nickel bis(dithiolene) complex of FIG. 1 and a second diol.

Yet another alternative embodiment yields Ni-BDT functionalized polyurethanes and polyurethane copolymers, as illustrated in FIG. 5, and explained in detail in Example IV below.

The polycarbonates containing Ni-BDT generally have high solubility in common organic solvents, and films can typically be cast from them. The polyurethanes containing Ni-BDT generally have high solubility in polar solvents such as DMF and DMSO. The high Ni-BDT content polymer (20%) shows decreased solubility. Both the Ni-BDT containing polycarbonates and polyurethanes are generally electroactive.

EXAMPLES

The following examples are designed to illustrate certain aspects of the present invention. The examples are not intended to be comprehensive of all features and all embodiments of the present invention, and should not be construed as limiting the disclosure presented herein.

EXAMPLE I: Preparation of Bifunctionalized Transition Metal Complex Comonomer Step 1: Preparation of 4-(chloroacetyl)phenethyl alcohol (5)

Finely ground AlCl$_3$ (92.0 g, 0.69 mol) was mixed with dichloromethane (120 ml) in a flask and cooled to $-10°$ C. Chloracetyl chloride (37.3 g, 0.33 mol) was added to the mixture as it was kept cool. Phenethyl alcohol (36.6 g, 0.30 mol) was dissolved in dichloromethane (20 ml) and charged to a dropping funnel. The phenethyl alcohol solution was added slowly dropwise to the mixture over 2 hours while stirring and keeping the temperature at about 10° C. At the end of the addition, the mixture was allowed to warm to room temperature and stirred overnight. The red color solution was poured into a large quantity of ice (about 300 g). The organic layer was separated and the aqueous layer was extracted with dichloromethane (200 ml), and the dichloromethane portions were washed with water until neutral. The organic phase was then dried (magnesium sulfate), concentrated, recrystallized (ether), and dried to give 48.8 g (81.9%) of compound 5. Analysis of the products gave the following results: mp 41°–45° C.; NIR (KBr) 3477, 3355, 2947, 1702, 1693, 1606, 1218, 1044, 818 cm$^{-1}$; $^1$H NMR (60 MHz) $\delta$ 1.96 (s, 1H), 2.92 (t, 2H, J=6.5 Hz), 3.90 (t, 2H, J=6.5 Hz), 4.67 (s,2H), 7.2–7.4 (m, 2H), 7.8–8.0 (m, 2H).

Step 2: Preparation of 4-(o-ethylxanthateacetyl)phenethyl alcohol (6)

A mixture of compound 5 (48.5 g, 0.244 mol) and o-ethylxanthic acid potassium salt (39.1 g, 0.244 mol) in acetone (250 ml) was heated to reflux for 3 hours. The mixture was allowed to cool to room temperature and filtered. The precipitate was washed with dichloromethane (50 ml). The combined organic phase was concentrated to give crude compound 6. The crude compound 6 was dissolved in dichloromethane (200 ml) and washed with water (100 ml). The solution was dried (magnesium sulfate), concentrated, and cooled to give a light yellow solid. The solid was crushed and washed with hexane to give 65.9 g (95.0%) of compound 6. Analysis of the product gave the following results: mp 53°–55° C.; NIR (KBr) 3329, 2891, 1672, 1605, 1224, 1113, 1054 cm$^{-1}$; $^1$H NMR (60 MHz) $\delta$ 1.33 (t, 3H, J=7 Hz), 2.90 (t, 2H, J=6.8 Hz), 3.85 (t, 2H, J=6.8 Hz), 4.60 (s, 2H), 4.60 (q, 2H, J=7 Hz), 7.2–7.4(m, 2H), 7.8–8.0 (m, 2H).

Step 3: Preparation of 4-(2-oxo- 1,3-dithiolyl)phenethyl acetate (7)

A mixture of compound 6 (63.4 g, 0.223 mol) and acetyl chloride (70 ml, 0.98 mol) was stirred at room temperature for 24 hours. Chloroform (200 ml) was added to the flask and the mixture was poured into ice (300 g). The chloroform solution was separated and washed with water until neutral, concentrated, recrystallized (ethanol), and dried to give 54.0 g (86.4%) of compound 7. Analysis of the product gave the following results: mp 55°–56° C.; NIR (KBr) 3079, 2964, 1728, 1632, 1256, 1042, 784 cm$^{-1}$; $^1$H NMR (300 MHz) $\delta$ 2.03 (s, 3H), 2.95 (t, 2H, J=6.8 Hz), 4.28 (t, 2H, J=6.8 Hz), 6.81 (s, 1H), 7.24–7.37 (m, 4H); $^{13}$C NMR (75 MHz) $\delta$ 192.29, 170.76, 139.20, 134.58, 130.92, 129.57, 126.30, 111.28, 64.28, 34.62, 20.78. Anal. Calcd. for C$_{13}$H$_{12}$O$_3$S$_2$: C, 55.69; H, 4.31; Found: C, 55.30; H, 3.97.

Step 4: Preparation of 4-(2-oxo-1,3-dithiolyl)phenethyl alcohol (8)

A mixture of compound 7 (40.0 g, 0.143 mol) dissolved in 500 ml methanol and 40 g $K_2CO_3$ dissolved in 300 ml water was stirred at room temperature for 1 hour. The mixture was extracted with 300 ml chloroform. The chloroform solution was washed with water, concentrated, recrystallized (methanol/ether), and dried to give 23.8 g (70.0%) of compound 8. Analysis of the product gave the following results: mp 92°-94° C.; NIR (KBr) 3258, 3060, 2927, 1697, 1632, 1503, 1055, 1046, 868 cm$^{-1}$; $^1$H NMR (300 MHz) δ 1.55 (s, 1H), 2.89 (t, 2H, J=6.8 Hz), 3.88 (t, 2H, J=6.8 Hz), 6.79 (s, 1H), 7.26-7.38 (m, 4H); $^{13}$C NMR (75 MHz) δ 192.52, 140.08, 134.80, 130.89, 129.79, 126.43, 111.19, 63.27, 38.75. Anal. Calcd. for $C_{11}H_{10}O_2S_2$: C, 55.44; H, 4.23; Found: C, 56.32; H, 4.56.

Step 5: Preparation of 1,1'bis[2-hydroxyethyl[4-(1,2-dithiolatoethenyl)benzene]] nickel (II) (9)

A mixture of compound 8 (1.500 g, 6.294 mmol) and sodium ethoxide (1.285 g, 18.88 mmol) in ethanol (100 ml) was heated at 60° C. with stir for 40 min. Nickel bromide (0.687 g, 3.147 mmol) dissolved in ethanol (200 ml) was added to the mixture via cannula. The resulting mixture was heated at 60° C. for 4 hours and then cooled to room temperature. The ethanol was removed and 200 ml acetone was added to the residue. After filtering and washing the solid residue with more acetone (2×100 ml), the acetone solution was collected and a solution of 50 ml water with 1 ml 37% HCl was added to the acetone solution. Removing the solvent gave the product which was washed with water and chloroform, then dried under vacuum to give 1.034 g (68.6%) of compound 9. Analysis of the product gave the following results: NIR (KBr) 3366, 3022, 2933, 1414, 1371, 1193, 1043, 1017, 864, 793 cm$^{-1}$; UV-Vis-NIR (THF) $\lambda_{max}(\epsilon)$ 295 (24,500), 365 (sh, 9100), 835 (10,150) nm. Anal. Calcd. for $C_{20}H_{20}NiO_2S_4$: C, 50.11; H, 4.21; Found: C, 49.84; H, 3.84.

EXAMPLE II: Polyester and Polyester Copolymer Formation

Preparation of Polyester

Poly[1-oxyethyl[4-(1,2-dithiolatoethenyl)benzene]-nickel(II)[(1',2,'-dithiolatoethenyl)4'-benzene]1'-ethyloxysebacoyl] (FIG. 2). In a 50 ml flask, compound 9 (0.479 g, 1 mmol) and sebacoyl chloride (0.239 g, 1 mmol) were dissolved in 10 ml DMF. 2 ml pyridine was added and the mixture was purged with nitrogen and kept under nitrogen atmosphere. The mixture was stirred at room temperature for 3 days. The DMF solution was precipitated into 100 ml methanol with vigorous stirring. The polymer was collected by filtration and washed thoroughly with water and methanol. The product was then dried in a vacuum oven at 70° C. for 24 hours to give 0.225 g (39.5%):IR (KBr) 3023, 2928, 2852, 1728, 1603, 1370, 1194, 1170, 863, 795 cm$^{-1}$; UV-Vis-NIR (THF) $\lambda_{max}(\epsilon)$ 840 (6450) nm. Anal. Calcd. for $(C_{30}H_{34}NiO_4S_4)_n$: C, 55.82; H, 5.31. Found: C, 57.24; H, 5.54.

Preparation of Polyester Copolymer

Copoly{1oxyethylene[4-(1,2-dithiolatoethenyl)benzene]nickel (II)[1',2'-dithiolatoethenyl)4'-benzene]1'-ethyleneoxysebacoyl]}-{poly(oxyethyleneoxy-sebacoyl) (FIG. 3). The procedure described for the synthesis of the polyester above was followed. Compound 9 (0.240 g, 0.5 mmol), ethyleneglycol (0.155 g, 2.5 mmol) and sebacoyl chloride (0.717 g, 3 mmol) were used. 0.540 g (60.5%) of polyester copolymer was isolated as a black tar material: IR (KBr) 3031, 2930, 2854, 1738, 1708, 1379, 1197, 1164, 868 cm$^{-1}$.

EXAMPLE III: Polycarbonate Copolymer Formation

Copolymerizations were carried out via the reaction scheme shown in FIG. 4 to prepare a series of polycarbonates containing different compositions of Ni-BDT complex along the polymer main chain. The mole percentage of the Ni-BDT complex in the feed ranged from 1% to 20% as indicated.

The general procedure for this example was as follows: A 50 ml three neck flask was charged with a certain amount of compound 9 (see Example I), along with bisphenol A or poly(ethylene glycol), total weight about 0.8 g, and 10 ml pyridine. The mixture was then purged with nitrogen for 10 min. Phosgene was admitted into the vapor space of the reaction flask while keeping thorough stirring. The temperature was maintained at about 25° C. Addition time for phosgene was about 1.5 hours, during which time the viscosity of the solution increased and pyridium hydrochloride precipitated.

The end point for the co-polymerization was determined by visual observation until the viscosity of the solution no longer increased as phosgene addition was continued. Sometimes a gel like mixture was formed.

The copolymer solution was then diluted with 10 ml chloroform and precipitated into 100 ml methanol with vigorous stirring. The copolymer was redissolved in 20 ml THF and filtered, although sometimes a portion of the polymer was insoluble as a gel, presumably due to very high molecular weight or crosslinking of the copolymer. The THF copolymer solution was reprecipitated into 100 ml methanol. The copolymer was filtered and dried at 65° C. in a vacuum oven overnight. The final yield of pure copolymer was about 40-70%.

EXAMPLE IV—Polyurethane Copolymer Formation

For the purpose of exploring the possibility of incorporating Ni-BDT complex units into polyurethanes, a series of polyurethane compounds containing Ni-BDT complex along the polymer main chain were prepared, via the reaction scheme shown in FIG. 5.

A modified literature procedure was adopted, and a series of polyurethanes prepared with a varied Ni-BDT content.

The general procedure was as follows. A 50 ml three neck flask with mechanical stirrer was charged with tolylene 2,4-diisocyanate (TDI) dissolved in 5 ml DMSO. Compound 9 and 1,10-decanediol were dissolved in 5 ml DMSO and charged into an additional funnel. The flask was heated to 60° C. and the DMSO solution of the diol was drop added to the flask with stirring over 10 min. After the completion of the addition, 5 drops of dibutyltin dilaurate were added as catalyst. The mixture was stirred for 4 hours at 60° C. The polymer solution was then diluted with 5 ml DMSO and precipitated into 200 ml methanol with vigorous stirring. The rubbery product was then cut to small pieces, washed with water and methanol, and dried at 70° C. in a vacuum oven overnight.

Samples 17-19 could not be completely dissolved in THF, suggesting possible crosslinking present in these polymers.

The instant invention has been disclosed in connection with specific embodiments. However, it will be apparent to those skilled in the art that variations from the illustrated embodiments may be undertaken without departing the spirit and scope of the invention.

BIBLIOGRAPHY

1. Alvarez et al, *J. Am. Chem. Soc.*, 107:6253 (1985).
2. Bousseau et al, *J. Am. Chem. Soc.*, 108:1908 (1986).
3. (a) Giroud et al, *Mol. Cryst. Liq. Cryst. (Lett.)*, 225 (1980); (b) Mueller-Westerhoff et al., *Mol. Cryst. Liq. Cryst. (Lett.)*, 249 (1980).
4. Cassoux et al, *Synth. Met.*, 19:573 (1987).
5. Tabushi et al, *Chem. Lett.*, p. 1373 (1987).
6. Shiozaki et al, *Chem. Lett.*, p. 2393 (1987).
7. U.S. Pat. No. 4,763,966—Suzuki et al.
8. Reynolds et al, *Macromolecules*, 20:1184 (1987).
9. Vicente et al, *Synth. Met.*, 13:265 (1986).
10. Gotzfried et al, *Angew. Chem., Int. Ed. Engl.*, 18:463 (1979).
11. Rivera et al, *J. Chem. Soc., Chem. Commun.*, 184 (1979).
12. Ribas et al, *C. R. Acad. Sci.*, Ser. 2, 293:665 (1981).
13. Teo et al, *J. Am. Chem. Soc.*, 99:4862 (1977).
14. Dirk et al, *Macromolecules*, 19:266 (1986).
15. Wang et al, *Macromolecules*, 21:2887 (1988).
16. Reynolds et al, *Synth. Met.*, 28:621 (1989).
17. Jolly et al, *Synth. Met.*, 29:189. (1989)
18. Reynolds et al, *ACS PMSE Proceedings* (Fall 1989).

What is claimed is:

1. A polymer having the formula:

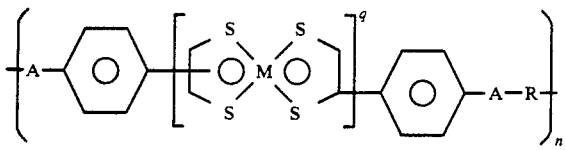

wherein:

—A— is derived from a reactive functional group;
—R— is an organic substituent derived from a bifunctional molecule capable of reacting with the reactive functional group;
M is a transition metal;
q is the oxidation state of the transition metal complex; and
n is the chain length of the polymer.

2. The polymer of claim 1, wherein M is a transition metal which provides a square planar transition metal complex center.

3. The polymer of claim 2, wherein M is Ni, Pd, or Pt.

4. The polymer of claim 1, wherein n is greater than about 5.

5. The polymer of claim 1, wherein n is greater than about 20.

6. The polymer of claim 1, wherein —A— is derived from a proton donating functional group and —R— is derived from a bifunctional molecule having active halide or isocyanate end groups.

7. The polymer of claim 6, wherein —A— is —O—;

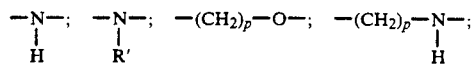

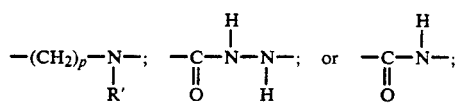

where p is a positive integer.

8. The polymer of claim 6, wherein —R— is

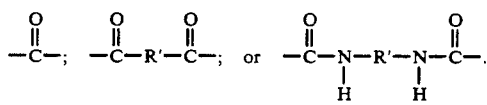

9. The polymer of claim 8, wherein —R'— is an alkyl or an aryl.

10. The polymer of claim 1, wherein —A— is derived from an active halide functional group and —R— is derived from a bifunctional molecule having proton donating end groups.

11. The polymer of claim 10, —A— is

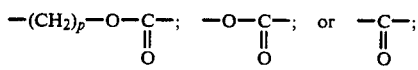

where p is a positive integer.

12. The polymer of claim 10, wherein —R— is —O—R'—O— or —NH—R'—NH—.

13. The polymer of claim 12, wherein —R'— is an alkyl or an aryl.

14. The polymer of claim 1, wherein q is −2, −1, 0 or +1.

15. A copolymer having the random formula:

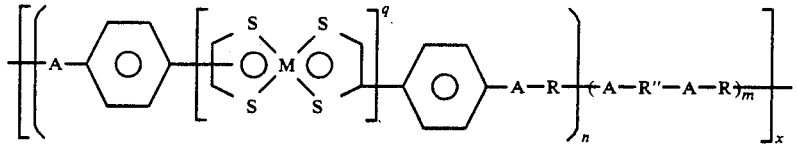

wherein:

—A— is derived from a reactive functional group;
—R"— is an organic substituent derived from a molecule bifunctionalized with reactive functional groups;
—R— is an organic substituent derived from a bifunctional molecule capable of reacting with the reactive functional groups;
M is a transition metal;
q is the oxidation state of the transition metal complex;
n is the chain length of the copolymer segments having bifunctionalized transition metal complex co-monomer units and is a varying positive integer;

m is the chain length of the copolymer segments having —R"— comonomer units and is a varying positive integer; and x is the overall chain length of the copolymer.

16. The copolymer of claim 15, wherein M is a transition metal which provides a square planar transition metal complex center.

17. The copolymer of claim 16, wherein M is Ni, Pd, or Pt.

18. The copolymer of claim 15, wherein m+n is greater than about 5.

19. The copolymer of claim 15, wherein m+n is greater than about 20.

20. The copolymer of claim 15, wherein —A— is derived from a proton donating functional group and —R— is derived from a bifunctional molecule having active halide end groups.

21. The copolymer of claim 20, wherein —A— is —O—;

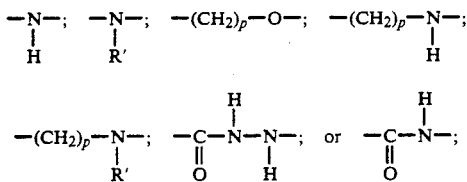

where p is a positive integer.

22. The copolymer of claim 20, wherein —R— is

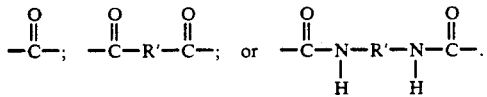

23. The copolymer of claim 22, wherein —R'— is an alkyl or an aryl.

24. The copolymer of claim 15, wherein —A— is derived from an active halide functional group and —R— is derived from a bifunctional molecule having proton donating end groups.

25. The copolymer of claim 24, wherein —A— is

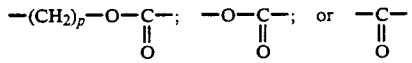

where p is a positive integer.

26. The copolymer of claim 24, wherein —R— is —O—R'—P— or —NH—R'—NH—.

27. The copolymer of claim 26, wherein —R'— is an alkyl or an aryl.

28. The copolymer of claim 15, wherein —R"— is an alkyl unit, an aryl unit, or an organic oligomer.

29. The copolymer of claim 15, wherein q is −2, −1, 0, or +1.

30. A method for preparing a transition metal bis(dithiolene) complex polymer, comprising the steps of:
preparing a transition metal bis(dithiolene) complex which is bifunctionalized; and
linking the bifunctional transition metal bis(dithiolene) complex with an organic compound which is bifunctionalized with functional groups capable of reacting with the bifunctional metal bis(dithiolene) complex.

31. A method for preparing a transition metal bis(dithiolene) complex copolymer, comprising the steps of:
preparing a transition metal bis(dithiolene) complex which is bifunctionalized;
providing a comonomer compound which is bifunctionalized; and
copolymerizing the bifunctional transition metal bis(dithiolene) complex and bifunctional comonomer compound with an organic compound which is bifunctionalized with functional groups capable of reacting with said bifunctional complex and compound.

32. The method of claim 30 or 31, further comprising the step of oxidizing the transition metal bis(dithiolene) complex centers to a higher oxidation state.

33. The method of claim 30 or 31, further comprising the step of reducing the transition metal bis(dithiolene) complex centers to a lower oxidation state.

34. The method of claim 30 or 31, wherein the bifunctional metal bis(dithiolene) complex includes proton donating end groups and the bifunctional organic compound includes active halide or isocyante end groups.

35. The method of claim 34, wherein each proton donating end group is:
—OH;
—NH$_2$;

—(CH$_2$)$_p$—OH;
—(CH$_2$)$_p$—NH$_2$; or

where p is a positive integer.

36. The method of claim 34, wherein the bifunctional organic compound is:

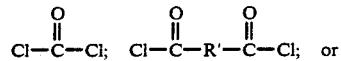

OCN—R'—NCO.

37. The method of claim 36, wherein R' is an alkyl or an aryl.

38. The method of claim 30 or 31, wherein the bifunctional metal bis(dithiolene) complex includes active halide end groups and the bifunctional organic compound includes proton donating end groups.

39. The method of claim 38, wherein each active halide end group is:

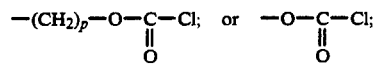

where p is a positive integer.

40. The method of claim 38, wherein the bifunctional organic compound is:
H$_2$N—R'—NH$_2$; or
HO—R'—OH.

41. The method of claim 40, wherein R' is an alkyl or an aryl.

42. An infrared filter comprising the polymer of claim 1.

43. An infrared filter comprising the copolymer of claim 15.

44. The infrared filter of claim 42, wherein the polymer comprises a film on a surface of a transparent substrate.

45. The infrared filter of claim 43, wherein the copolymer comprises a film on a surface of a transparent substrate.

46. A method of filtering infrared light comprising directing radiation through an infrared filter as recited in claim 42 or 43.

* * * * *

UNITED STATES PATENT AND TRADEMARK OFFICE
CERTIFICATE OF CORRECTION

PATENT NO.   :   5,089,585
DATED        :   February 18, 1992
INVENTOR(S)  :   Reynolds et al.

It is certified that error appears in the above-identified patent and that said Letters Patent is hereby corrected as shown below:

In claim 26 at column 13, line 53, "P" should be --O--.

Signed and Sealed this

Eighth Day of June, 1993

Attest:

MICHAEL K. KIRK

Attesting Officer

Acting Commissioner of Patents and Trademarks